United States Patent [19]
Beshay

[11] Patent Number: 4,820,749
[45] Date of Patent: * Apr. 11, 1989

[54] REINFORCED POLYMER COMPOSITES WITH WOOD FIBERS GRAFTED WITH SILANES

[76] Inventor: Alphons D. Beshay, 3595 de Courval, Trois-Riviéres, Quebec, Canada, G8Z 1S8

[*] Notice: The portion of the term of this patent subsequent to Jan. 5, 2005 has been disclaimed.

[21] Appl. No.: 95,119

[22] Filed: Sep. 11, 1987

Related U.S. Application Data

[63] Continuation-in-part of Ser. No. 739,469, May 29, 1985, Pat. No. 4,717,742.

[51] Int. Cl.$^4$ .................. C08K 9/06; C08L 25/06; C08L 23/06
[52] U.S. Cl. .................................. 523/203; 523/212; 523/213; 523/214; 524/13; 524/35; 524/47; 524/52; 524/577; 524/583; 524/585
[58] Field of Search ............... 523/203, 212, 213, 214; 524/13, 35, 47, 52

[56] References Cited

U.S. PATENT DOCUMENTS

| 4,374,178 | 2/1983 | Kulkarni et al. | 523/203 |
| 4,554,215 | 11/1985 | Robbart | 428/448 |
| 4,717,742 | 1/1988 | Beshay | 523/203 |

FOREIGN PATENT DOCUMENTS

| 0008143 | 2/1980 | European Pat. Off. |
| 57-192466 | 5/1981 | Japan . |
| 58-11537 | 1/1983 | Japan . |

OTHER PUBLICATIONS

Derwent Abs. 80-32067/18, Showa Elect Wire KK (J55040840), 3-1980.
Robert W. Lenz, "Organic Chemistry of Synthetic High Polymers", pp. 710-719, Interscience Publishers, N.Y., 1967.

Primary Examiner—Herbert J. Lilling

[57] ABSTRACT

Composite material based on a polymeric or copolymeric substance which may be a thermoplastic or thermosetting material or rubber, and an organic material which is cellulosic or starch. The cellulosic material is grafted with a silylating agent. Processes for preparing this composite are also disclosed.

20 Claims, No Drawings

REINFORCED POLYMER COMPOSITES WITH WOOD FIBERS GRAFTED WITH SILANES

CROSS-REFERENCE

This application is a continuation-in-part of application Ser. No. 739,469 filed May 29, 2985 now U.S. Pat. No. 4,717,742.

BACKGROUND OF INVENTION (1) Field of the Invention

This invention relates to polymer composites. More particularly, this invention relates to a technique for grafting organic materials as such, or mixed with an inorganic material, with a silylating agent. Bonding the silylated material with a polyolefin resin produces either composites having improved physicomechanical properties, or composites having only strongly bonded components.

(2) Description of Prior Art

The modification of the physical and mechanical properties of thermoplastic, thermosetting or rubbers by the addition of a filler is well known in the art. Greater degrees of property improvement result when the filler is uniformly and highly dispersed throughout the polymer matrix and/or when its chemical interface provides a possible site weakness in the composite.

Various means for improving the compatibility of the filler with the polymer matrix by providing an interaction between the filler and the polymer are known in the art. For example, when a cellulosic material, such as wood fibers, or cotton fibers, are used as a filler in the polymers containing methylol groups such as phenolic urea or melamine resins, a reaction occurs between the methylol groups and the hydroxyl groups on the cellulosic filler. Inorganic fillers such as calcium carbonate, clay or asbestos have been encapsulated and dispersed in a polyolefin in order to obtain improved properties. Some materials such as maleic anhydride or others were bonded by the effect of the initiating agents such as peroxides. In such a system, the polymer used to coat the filler should be chemically bonded to the filler in order to obtain optimum properties such as high strength.

The E.P. Pat. No. 0008143-Solvay & Cie, issued in Feb. 20, 1980, and the Japanese Pat. No. J5 8011-537-Showa Den Kokk, issued on Jan. 22, 1983, both teach the application of organic and/or inorganic fillers in presence of a peroxide and an acid anhydride, resulting in composite materials having relatively little improvements in their mechanical strengths.

The Japanese Pat. No. J5 719 2-466 Showa issused in May 5, 1981, teaches the addition of an unsaturated silane coupling agent onto the polyolefin matrix material by the effect of a catalyst peroxide and then by adding a wood flour to act as a filler. The composite materials produced according to this reference have improved impact strength, but, in comparing their relative improvement values with those realised by the present invention they were found much lower, because the silane coupling agent was grafted onto the polymer resin and was not grafted onto the cellulosic filler material. Grafting and bonding of a silylating agent onto cellulosic fibers whether premixed or not with an inorganic filler leads to producing composite materials having dramatic higher physicomechanical properties beside their high durability and resistivity to heat, cold and solvents. It should be noted that the silane ratios added according to the present invention can be lowered by prehydrolysing in acid medium which leads to cost economy.

According to the present invention, the silane grafting and bonding process creates strong attachments between the mixture of components and the silylating agent. The grafting process could either be partial or complete. The process could be completed by the effect of a hot molten polymer resin, which provides sites for the formation of free radicals with desired degrees of loading by the initiation effect to attach by chemical bonding to the other side of the silylating agent molecules, which are pregrafted and prebonded with the mixture of materials. Thus, for example, the flow properties of polyethylene are improved by the incorporation of the grafted filler mixture in the presence of maleic anhydride and a free radical catalyst such as benzoyl peroxide. The composition ratios range from 1 to 99% by weight of the grafted and bonded silylated materials.

SUMMARY OF THE INVENTION

An object of this invention is to provide an improved technique for compatibilizing particulate silylated materials with polymeric matrix material or rubber.

Another object of this invention is to provide a process for grafting a silylating agent onto an organic material which may be previously mixed with an inorganic material.

The organic material is selected from the group of starch and cellulosic materials. Any effective method can be applied for grafting and bonding a silylating agent onto the said organic materials or organic and inorganic mixture of materials, so as to make the filler or bonding materials compatible for thermoplastic or thermosetting polymers or rubber with controlled weight ratios according to desired applications.

One embodiment of this invention proves that the resultant mechanical strengths of composites produced from bonding thermoplastic polymer with silylated mixture of organic and inorganic materials are much better compared to those of composites produced by bonding the same polymer resin with each individual silylated mixture components.

A further embodiment of this invention is not only to render a silylated mixture of an organic and an inorganic materials compatible as a filler for thermoplastic polymers to improve their physical and mechanical properties, but also to bond, glue or coat said silylated mixture of materials, or the silane grafted cellulosic material only, with a polymer resin which is thermoplastic or thermosetting, or rubber, which leads to several useful applications such as fabrication of boards or panels, plastic coating, glueing, or to be adapted for other useful applications.

The cellulosic, inorganic or polymer resin materials could be in different states and forms. The states could be solids, dissolved or melted solids, liquids or solutions. The forms could be powders, particles, crystals, fibers, sheets, papers, cartons, threads, cloth, gravels, chips, boards, panels, pre-shaped forms, etc.

This invention can be optimized by adjusting the methods and/or conditions of preparations. Thus, it shows its most useful application with polyethylene and polypropylene reinforced with wood pulps mixed or not with calcium carbonte, asbestos or clay and grafted with silylating agent, in the present or absence of maleic anhydride. It will be more specifically described hereafter in details, regarding composites of linear low density polyethylene-wood pulp/asbestos, linear low density polyethyelene-wood pulp/asbestos, polypropylene/aspen wood pulp/calcium carbonate. However, this invention is not limited to such materials, nor to their weight ratios. It also shows advantages when used with any kind or any weight ratio of silylating agents in grafting with any kind or any weight ratio of organic fillers selected from the group of starch or cellulosic material such as cotton fibers, other wood pulps, stem or vegetable fibers, wood flours, starch, waste papers, cartons, or cellulosic cloth or any natural or synthetic cellulosic material which may be mixed with any kind or any weight ratio of inorganic fillers selected from a compound containing hydroxyl group, clay, calcium carbonate, asbestos, sand, wollastonite, quartz, glass, mica, diatomaceous earth, silica talc, kaolinite, aramide, hydrate or partially hydrate metal oxides, metal powders, metal compounds, carbon, graphite, synthetic, or a natural occurring material and if naturally occurring they could be used in either purified or unpurified form. Also other organic materials such as lignin or lignin compounds can be mixed with said cellulosic materials and also more than one kind of inorganic material can be mixed or bonded with the cellulosic materials.

In addition, for the preparation of composites by compounding the silylated mixture of materials with rubbers, thermosettings or thermoplastic polymers, the polymers may be those described in said U.S. Pat. No. 4,317,765.

The ethylenically unsaturated carboxylic acid or acid anhydride as an auxiliary agent used in the practice of this invention is preferably a dicarboxylic acid such as maleic acid, maleic anhydride, furmaric acid, citraconic acid, or itaconic acid. Maleic anhydride is the preferred auxiliary agent. Monocarboxylic acids such as acrylic acid and methacrylic acid may also be used.

Instead of maleic anhydride polymaleic anhydride, succinic anhydride or any acid/acid anhydride and the like may be used.

The means for generating free radicals is preferably accomplished by using a free radical catalyst such as a peroxide (for example, t-butyl perbenzoate, dicumyl peroxide, methylethylketone peroxide, benzoyl peroxide, di-t-butyl peroxide, and 2,5-dimethyl-2,5-di(t-butyl peroxy) hexane. A more detailed compilation of free radical initiators which may be used is set forth at pages 11-3, to 11-51 of "Polymer Handbook", Interscience Publishers (1966). Also the grafting process can be carried out by the effect of gamma radiation, U.V. radiation or any other effective process, for grafting the silylating agent.

The silylating agents according to this invention are gamma-aminopropyltriethoxysilane, a gamma-methacryloxypropyl trimethoxysilane and propyl triethoxy silane. However, this invention is not limited to such silanes, nor to the disclosed weight ratios. They may advantageously be replaced by other kinds or other weight ratios of silylating agents, for example, vinyltriethoxysilane, vinyltri(2-methoxy-ethoxy)silane, beta-(3,4-epoxycyclohexyl)-ethyltrimethoxysilane, gamma-glycidoxypropyltrimethoxysilane, gamma-mercaptopropyltrimethoxysilane, gamma-aminopropyltriethoxysilane, n-beta-(aminoethyl), gamma-aminopropyltrimethoxysilane, n-beta-(aminoethoxyl)gamma-aminopropyltrimethoxysilane and gamma-chloropropyltrimethoxysilane or any other silylating agent having the general formula

or an oligomer thereof, wherein $R_1$, $R_2$ and $R_3$ are the same or different and are selected from the group comprising alkoxy with 1 to 6 carbon atoms, alkyl, alkenyl, cycloalkyl with 1 to 6 carbon atoms, aryl aralkyl and organo-functional radicals.

Silanes grafted and bonded onto a hydrophilic cellulosic fibers whether mixed or not with an inorganic particles according to this invention contribute to the wrapping and bonding these materials with the hydrophobic polymer resin. The selected percentages of silylating agent added were 0.1-8 (filler weight percent) of gamma-aminopropyltiethoxysilane, gamma methocryloxypropyltrimethoxysilane or propyltriethoxysilane. The presence of maleic anhydride may lead to the formation of a little part of maleiated polymer resin by the effect of the free radical initiator present and the heat melt of the polymer. The selected weight percentage of maleic anhydride is 0-5% of the mixture of materials used. The selected percentage of the free radical initiator was 0.1-5% by weight with respect to the filler, which acts to initiate the hydroxylic cellulosic functional groups, part of the heat melt polymer matrix, the maleic anhydride present and may eliminate the ethoxyl or methoxyl groups of silane molecules to be grafted onto the initiated cellulosic molecules of the filler. This takes place during the hot melt mixing on the roll mill or extruder. Furthermore, the oxygen atoms of the maleiated polymer attach to some of the hydrogen atoms of cellulosic hydroxylic functional groups through the formation of hydrogen bonding. The superior mechanical properties according to this invention are achieved by grafting 2% by weight of the filler of gamma-aminopropyltriethoxysilane onto dry chemical-thermomechanical aspen wood pulp only or onto aspen wood pulp mixed with 10-30 weight percent of calcium carbonate with respect to wood pulp. The wood pulp is ground at mesh size 60 and the calcium carbonate at mesh size 150. These superior mechanical properties are due to further combination with oxygen atoms of the maleiated polymer and with the silane amino functional group by eliminating water molecule. A silylating agent when being hydrolyzed by an aqueous alkaline or acidic solution may decrease the added silane percentage and give composites having the same mechanical strengths by formation of a silane monolayer. All the above-mentioned weight ratios can be varied to optimize the results. Also the addition of wax slightly improve the results.

Some aspects of this invention, during its preparation, are the easiness in its chemical technique, time and energy saving, no waste of chemicals and lower in costs. In a further embodiment, the organic filler used in the present invention for preparing composites have low cost economy, light weight, less machine wear, no health hazard and renewable nature. The resultant composite materials in this invention have high durability and less surface fracture and superior stability under extreme temperature conditions compared to other composites filled with fiber glass or mica or the like.

A method for preparing composite materials according to the present invention is as follows:

(1) Forming a silylated solution by dissolving in an organic solvent a silylating agent (hydrolyzed or not) possibly in the presence of benzoylperoxide. Maleic anhydride may be added or not. The polymeric matrix material could be dissolved in the same silylated solution or not. Grinding the organic material at available mesh size the latter to be mixed or not with an inorganic material.

(2) The organic materials may be selected from the group consisting of starch and cellulosic materials. The inorganic material is selected from a compound containing hydroxyl group, clay, calcium carbonate, asbestos, sand, wallstonite, glass, quartz, mica, diatomaceous earth, silica, talc, kaolinite, aramide, hydrate or partially hydrate metal oxides, metal powders, metal compounds, carbon, graphite, or a natural occurring material and if naturally occurring it could be used in either purified or unpurified form.

(3) Wetting by spraying said materials of step (2) with the silylated solution of step (1), then evaporating the solvent from the wetted mixture material by passing hot air current or by subjecting to conditions effective to produce a grafted cellulosic materials or grafting and bonding silylated mixture materials.

(4) Mixing polymeric or copolymeric matrix materials which are thermoplastic or thermosetting, or rubber with lower weight ratios of the prepared silylated material(s) of step (3) to give reinforced and bonded composite material(s) or mixing the same silylated material(s) in high weight ratios with the same matrix materials to give only bonded composite materials.

This invention will now be further described by non-limiting examples.

EXAMPLES 1,2,3, & 12, 13

20 g of dry and ground at mesh 60 of semichemical pulp of bagasse, chemical thermomechanical wood pulp of aspen or birch were placed in a beaker of 500 ml. capacity. A mixture of 0.16g benzoyl peroxide, 0.2g maleic anhydride and 0.2, 0.4 or 0.8g of gamma-aminopropyltriethoxysilane, gamma-methacryloxypropyltrimethoxysilane or propyltriethoxysilane were well dissolved together in 15ml acetone as a solvent and were added by spraying to the pulp while stirring. The stirring continued for another 30 minutes. The beaker contents were then subjected to a warm air current for 1–2 hours. 30% of linear low density polyethylene were added to be melt first on a hot roll-mill (at 140° C.). The remaining 70% of the polyethylene previously were mixed with silane-pulp to form a homogenized mixture by using a blender, and were added later on to the roll-mill. All composite quantity was collected and remixed on the roll-mill every half minute and for 15 minutes, then the melted composite was collected to cool down to room temperature and ground to mesh 20 to be molded for testing in accordance with ASTM standard D 1822-79. The results are given below in tables 1, 2 and 11.

TABLE 1

| | Example 1 | | | | | | | | |
|---|---|---|---|---|---|---|---|---|---|
| | Energy $KJ \times 10^5$ | | | Stress MPa | | | Modulus MPa | | |
| Weight % of aspen pulp grafted with silane | 20 | 30 | 40 | 20 | 30 | 40 | 20 | 30 | 40 |
| *Silane conc. | | | | | | | | | |
| 1% | 35.0 | 37.0 | 36.8 | 22.4 | 25.1 | 26.0 | 344.7 | 386.0 | 400.0 |
| 2% | 51.3 | 55.9 | 50.4 | 25.9 | 28.6 | 31.4 | 336.9 | 372.0 | 506.0 |
| 3% | 42.1 | 48.0 | 43.6 | 23.7 | 27.1 | 31.2 | 349.1 | 399.5 | 534.7 |
| 4% | 41.3 | 44.0 | 46.2 | 26.1 | 29.1 | 31.8 | 358.6 | 401.3 | 542.8 |
| Linear low density polyethylene | | 20.4 | | | 14.8 | | | 43.5 | |

*silane bonding agent is gamma-aminopropyltriethoxysilane.

TABLE 2

| | Examples 2 & 3 | | | | | | | | |
|---|---|---|---|---|---|---|---|---|---|
| | Energy $KJ \times 10^5$ | | | Stress MPa | | | Modulus MPa | | |
| Weight % of aspen, birch & bagasse grafted with 2% silane* | 20 | 30 | 40 | 20 | 40 | 40 | 20 | 30 | 40 |
| Aspen grafted with silane* | 51.3 | 55.9 | 50.4 | 25.9 | 28.6 | 31.4 | 336.9 | 372.0 | 506.0 |
| Birch grafted with silane* | 48.2 | 49.3 | 48.0 | 24.1 | 28.4 | 30.1 | 336.1 | 365.3 | 477.4 |
| Bagasse grafted with silane* | 35.7 | 39.9 | 41.4 | 24.4 | 26.7 | 27.2 | 291.8 | 340.9 | 383.6 |

*silane bonding agent is gamma-aminopropyltriethoxysilane.

EXAMPLE 6

Treatment of aspsen wood pulp with silylating agent in absence of initiator 0.8 g of silylating agents mentioned in example No 1, 2, was dissolved in 15 ml of acetone and was added as droplets for 5 minutes to 20 g of aspen wood pulp (mesh size 60) while stirring for 10 minutes. After this addition, stirring continued for another 20 minutes. The mixture was left at 45° C. in a circulated air oven for 1/2 hour, before being mixed with the polymer on the roll mill. (Table 3)

TABLE 3

| | COMPOSITES OF SILANE TREATED ASPEN PULPS | | | | | | | | | | | | | | | |
|---|---|---|---|---|---|---|---|---|---|---|---|---|---|---|---|---|
| ASPEN Mesh 60 (Wt %) | ENERGY $(KJ \times 10^5)$ | | | | STRAIN (%) | | | | STRESS (MPa) | | | | MODULUS (MPa) | | | |
| | 10 | 20 | 30 | 40 | 10 | 20 | 30 | 40 | 10 | 20 | 30 | 40 | 10 | 20 | 30 | 40 |
| 4% Silane gamma amino propyl | 12.3 | 13.3 | 11.8 | 9.64 | 14.1 | 12.4 | 11.4 | 7.1 | 15.6 | 17.7 | 18.4 | 19.7 | 65.0 | 84.3 | 95 | 164.2 |

TABLE 3-continued

COMPOSITES OF SILANE TREATED ASPEN PULPS

| ASPEN Mesh 60 (Wt %) | ENERGY (KJ × 10⁵) | | | | STRAIN (%) | | | | STRESS (MPa) | | | | MODULUS (MPa) | | | |
|---|---|---|---|---|---|---|---|---|---|---|---|---|---|---|---|---|
| | 10 | 20 | 30 | 40 | 10 | 20 | 30 | 40 | 10 | 20 | 30 | 40 | 10 | 20 | 30 | 40 |
| triethoxy silane |  |  |  |  |  |  |  |  |  |  |  |  |  |  |  |  |
| 4% Silane gamma metacyloxy propyl trimethoxy silane | 13.8 | 15.2 | 12.7 | 10.4 | 15.1 | 14.4 | 12.4 | 11.7 | 17.8 | 19.8 | 20.3 | 24.7 | 68.5 | 94.2 | 96.7 | 123.5 |
| 4% propyl-triethoxy silane | 11.2 | 12.1 | 11.8 | 8.9 | 13.4 | 13.3 | 11.7 | 9.3 | 16.8 | 16.9 | 18.2 | 18.4 | 66.3 | 79.3 | 93.6 | 142.3 |
| LLDPE | | 20.4 | | | | 20.3 | | | | 14.8 | | | | 43.5 | | |

EXAMPLE 17

Effect of maleic anhydride on aspec wood pulp in absence of silylating agent

Same procedure as in example No. 1, but in the absence of silylating agent.

Table 4 indicates the mechanical properties of polyethylene composites filled with aspen pulp treated with maleic anhydride, as explained in example 7.

TABLE 4

| TREATED ASPEN PULP weight % | Tensile strength (MPa) | Strain % | Energy J × 10² | Modulus (MPa) |
|---|---|---|---|---|
| 0 | 14.8 | 20.3 | 20.4 | 43.5 |
| 10 | 17.1 | 19.9 | 22.6 | 45.5 |
| 20 | 18.9 | 14.2 | 31.5 | 70.8 |
| 30 | 22.9 | 9.2 | 36.5 | 132.7 |
| 40 | 26.3 | 7.7 | 32.2 | 181.4 |

Some improvements appeared when aspen pulp treated with maleic anhydride, in presence of free radical initiator. This slight improvement of tensile strength, energy & modulus is due to the effect of maleic anhydride coupling agent.

TABLE 5

Example 4: COMPOSITES OF UNGRAFTED WOOD PULPS WITH LINEAR LOW DENSITY POLYETHYLENE

| Experiment | Energy (KJ) × 10⁵ | | | | Strain (%) | | | | Stress (MPa) | | | | Modulus (MPa) | | | |
|---|---|---|---|---|---|---|---|---|---|---|---|---|---|---|---|---|
| Fibers (wt %) | 10 | 20 | 30 | 40 | 10 | 10 | 30 | 40 | 10 | 20 | 30 | 40 | 10 | 20 | 30 | 40 |
| Aspen (CTMP)* (Mesh 60) | 1.5 | 15.4 | 8.4 | 8.3 | 8.2 | 5.9 | 4.1 | 3.4 | 12.6 | 15.2 | 18.4 | 17.6 | 90 | 152 | 262 | 467 |
| Birch (CTMP) | 9.6 | 10.9 | 5.0 | 2.7 | 9.4 | 5.9 | 5.3 | 3.9 | 12.5 | 17.6 | 18.8 | 17.1 | 148.5 | 226 | 208.8 | 255.2 |
| Linear low density polyethylene (LLDPE) | | 20.4 | | | | 20.3 | | | | 14.8 | | | | 43.5 | | |

*Chemicalthermomechanical pulp = CTMP

TABLE 6

Example 5: UNGRAFTED ASPEN PULP POLYPROPYLENE COMPOSITES

| MECHANICAL PROPERTIES | POLYPROPYLENE (PP) | ASPEN PULP-POLYPROPYLENE COMPOSITES | | | |
|---|---|---|---|---|---|
| | | 10% | 20% | 30% | 40% |
| Modulus (MPa) | 104.8 | 197.9 | 267.7 | 312.5 | 374.8 |
| Stress (MPa) | 29.5 | 30.3 | 23.0 | 23.5 | 26.5 |
| Energy (Kj/m²) | 77.9 | 43.8 | 10.9 | 8.9 | 9.3 |
| Strain % | 0.0165 | 0.009 | 0.005 | 0.0044 | 0.0041 |

It may be seen from these results that there is no significant increase in mechanical properties in the ungrafted aspen or birch pulp-polyethylene composites, Table 5, or ungrafted aspen pulp-polypropylene composites, Table 6.

EXAMPLE 8

The Suzorite mica (200 mesh coated), or glass fiber 0.8 mm (coated), was mixed with the linear lower density.

The mechanical results are shown on Table No. 7.

TABLE 7

| Experiment | Energy (KJ) × 10⁵ | | | Strain (%) | | | Stress (MPa) | | | Modulus (MPa) | | |
|---|---|---|---|---|---|---|---|---|---|---|---|---|
| Filler (wt %) | 20 | 30 | 40 | 20 | 30 | 40 | 20 | 30 | 40 | 20 | 30 | 40 |
| Grafted Aspen Pulp "Mesh 60" with 2% gamma-amino propyltrimethoxy silane | 51.3 | 55.9 | 50.4 | 28.6 | 25.6 | 20.4 | 25.9 | 28.6 | 31.4 | 336.9 | 372.0 | 506.0 |
| Mica (Suzorite-200-NP) silane treated | 22.2 | 9.5 | 6.7 | 11.8 | 7.1 | 5.3 | 20.1 | 19.7 | 22.0 | 100.5 | 159.3 | 238.7 |
| Glass Fiber silane treated | 17.1 | 21.2 | 20.9 | 17.1 | 15.3 | 11.2 | 15.2 | 14.2 | 12.2 | 52.8 | 53.7 | 65.1 |

TABLE 7-continued

| Experiment | Energy (KJ) × 10⁵ | | | Strain (%) | | | Stress (MPa) | | | Modulus (MPa) | | |
|---|---|---|---|---|---|---|---|---|---|---|---|---|
| Filler (wt %) | 20 | 30 | 40 | 20 | 30 | 40 | 20 | 30 | 40 | 20 | 30 | 40 |
| (0.8 mm) | | | | | | | | | | | | |

The results presented in Table 7 show that the composites of grafted aspen wood pulp with a silylating agent give superior mechanical properties compared with composites of mica or glass fiber. In addition, the price of coated mica or fiber glass is much higher than the costs of the grafted wood fibers subject of the present invention.

GRAFTED PULP WITH SILYLATING AGENT POLYETHYLENE COMPOSITES AT EXTREME TEMPERATURE CONDITIONS

EXAMPLE 9

After boiling in water for 4 hours:

The mechanical results after boiling in tap water for 4 hours are indicated on Table 8.

TABLE 8

| Filler (Wt) | Stress (MPa) | Strain % | Energy J × 10² | Modulus (MPa) |
|---|---|---|---|---|
| LLDPE | 16.3 | 16.8 | 20.4 | 66.7 |
| Grafted 20% | 23.01 | 22.3 | 39.5 | 104.6 |
| Pulp with gamma amino- 30% propyl triethoxy silane 40% | 23.6 | 19.6 | 42.7 | 159.9 |
| | 31.5 | 18.4 | 45.6 | 405.0 |
| Mica silane treated 30% | 15.3 | 7.1 | 9.4 | 113.1 |
| Glass Fiber silane treated 30% | 17.6 | 15.2 | 21.3 | 82.2 |

It is very exciting to see that the silane grafted aspen pulp-polyethylene composites (as example 1) remain virtually unaffected by boiling. The samples remained stronger than polyethylene, mica, or fiber glass.

EXAMPLE 10

After being kept at 105° C. for seven days:

TABLE 9

| | Stress | Strain | Energy | Modulus |
|---|---|---|---|---|
| Filler (Wt) | (MPa) | % | J × 10² | (MPa) |
| LLDPE | 14.95 | 4.6 | 7.3 | 159.94 |
| Grafted 20% | 25.4 | 20.18 | 42.9 | 494.8 |
| Pulp with gamma amino- 30% | 29.9 | 17.3 | 42.4 | 566.9 |
| propyl triethoxy silane 40% | 32.2 | 16.4 | 41.8 | 999.45 |
| Mica silane treated 30% | 23.2 | 6.6 | 12.3 | 476.4 |
| Glass Fiber | 18.4 | 1.9 | 33.9 | 533.9 |

TABLE 9-continued

| Filler (Wt) | Stress (MPa) | Strain % | Energy J × 10² | Modulus (MPa) |
|---|---|---|---|---|
| silane treated 30% | | | | |

EXAMPLE 11

Measuring at −40° C.:

The measurements of composite samples were carried out in Instron Environmental Chamber System (Model 3111).

TABLE 10

| Filler (Wt) | Stress (MPa) | Strain % | Energy J × 10² | Modulus (MPa) |
|---|---|---|---|---|
| LLDPE | 31.24 | 11.32 | 26.5 | 581.8 |
| Grafted 20% | 42.7 | 12.1 | 37.6 | 938.1 |
| Pulp with gamma amino- 30% | 43.0 | 11.98 | 39.5 | 923.6 |
| propyl triethoxy silane 40% | 47.2 | 11.3 | 39.2 | 1158.1 |
| Mica silane treated 30% | 32.8 | 5.2 | 12.6 | 849.6 |
| Glass Fiber silane treated 30% | 33.2 | 8.7 | 22.1 | 1119.4 |

Finally, with respect to the results presented in Table 10 dealing with composites, their behaviour at −40° C. shows that grafted aspen pulp with silane A-1100 composites do not lose their reinforcing properties even at −40° C. and keep their reinforcing advantages vis-a-vis glass fibers or mica.

EXAMPLES 12–17

According to the procedure described in the previous example No. 1, wherein wood pulps are substituted by clay, asbestos or calcium carbonate. The results are given in Tables 11 and 14.

TABLE 11

| | Examples 14, 15 & 16 | | | | | | | | |
|---|---|---|---|---|---|---|---|---|---|
| | Energy KJ × 10⁵ | | | Stress MPa | | | Modulus MPa | | |
| Weight % of inorganic filler bonded with 2% silane* | 20 | 30 | 40 | 20 | 30 | 40 | 20 | 30 | 40 |
| Example 14: Calcium carbonate bonded with silane* | 27.7 | 34.0 | 35.7 | 20.9 | 21.2 | 21.9 | 87.4 | 97.9 | 114.0 |
| Example 15: Asbestos bonded with silane* | 23.7 | 25.1 | 27.1 | 17.3 | 17.4 | 17.6 | 91.5 | 101.2 | 102.3 |
| Example 16: Clay bonded with silane* | 25.6 | 28.8 | 29.5 | 94.4 | 16.9 | 17.1 | 85.3 | 94.4 | 101.2 |

*silane bonding agent is gamma-aminopropyltriethoxysilane.

EXAMPLES 18, 19, 20 & 21

As described in example No. 1, wherein aspen wood pulp was well mixed in weight ratios from 10–30 with calcium carbonate, asbestos or clay. The mixing was carried before spraying the silylated solution.

Mixing of cellulosic and inorganic materials improve the mechanical strengths as shown in Tables 12, 13 & 14.

TABLE 12

| | Example 18 | | | | | | | | |
|---|---|---|---|---|---|---|---|---|---|
| | Energy KJ × 10⁵ | | | Stress MPa | | | Modulus MPa | | |
| Weight % of filler mixture grafted and bonded with 2% silane* | 20 | 30 | 40 | 20 | 30 | 40 | 20 | 30 | 40 |
| Aspect ratios of calcium carbonate to aspen wood pulp: | | | | | | | | | |
| 10% | 54.4 | 57.4 | 53.0 | 27.2 | 30.8 | 31.9 | 384.1 | 447.2 | 545.9 |
| 20% | 60.0 | 67.4 | 53.4 | 27.7 | 33.4 | 34.4 | 405.6 | 483.7 | 567.8 |
| 25% | 64.1 | 72.4 | 62.8 | 33.4 | 38.1 | 36.8 | 459.3 | 599.3 | 582.1 |
| 30% | 56.8 | 57.2 | 58.4 | 30.7 | 36.1 | 31.9 | 452.4 | 583.2 | 581.4 |
| 40% | 48.3 | 48.7 | 50.4 | 28.3 | 29.3 | 29.7 | 391.2 | 451.9 | 549.2 |

*silane bonding agent is gamma-aminopropyltriethoxysilane.

TABLE 13

| | Examples 18, 19 & 20 | | | | | | | | |
|---|---|---|---|---|---|---|---|---|---|
| | Energy KJ × 10⁵ | | | Stress MPa | | | Modulus MPa | | |
| Weight % of filler mixture grafted and bonded with 2% silane* | 20 | 30 | 40 | 20 | 30 | 40 | 20 | 30 | 40 |
| Example 18: 25% of calcium carbonate to aspen pulp | 64.1 | 72.4 | 62.8 | 33.4 | 38.1 | 36.8 | 459.3 | 599.3 | 582.1 |
| Example 19: 25% of asbestos to aspen pulp | 52.9 | 56.8 | 54.3 | 26.4 | 30.5 | 32.3 | 412.3 | 425.4 | 577.8 |
| Example 20: 25% of clay to aspen pulp | 52.4 | 56.7 | 50.9 | 25.9 | 29.1 | 31.4 | 397.3 | 443.2 | 531.5 |

TABLE 14

| | Examples 12, 13, 17 & 21 | | | | | | | | |
|---|---|---|---|---|---|---|---|---|---|
| | Energy KJ × 10⁵ | | | Stress MPa | | | Modulus MPa | | |
| Weight % of silylated filler to LLDPE | 20 | 30 | 40 | 20 | 30 | 40 | 20 | 30 | 40 |
| Example 12: Weight % of aspen pulp grafted with * or | 36.4 | 42.3 | 40.1 | 20.5 | 25.1 | 28.2 | 298.7 | 306.2 | 424.0 |
| Example 13: with ** | 35.3 | 40.1 | 38.2 | 19.7 | 23.2 | 25.8 | 221.3 | 287.4 | 314.2 |
| Example 17: Weight % of calcium carbonate bonded with * | 25.6 | 27.4 | 34.1 | 19.4 | 20.3 | 21.9 | 77.5 | 87.4 | 108.4 |
| Example 21: Weight % of aspen pulp mixed with 25% calcium carbonate, grafted and bonded with * | 48.3 | 53.1 | 51.2 | 28.2 | 30.5 | 33.1 | 314.2 | 413.1 | 502.4 |

*2% gamma-methacryloxypropyltrimethoxysilane.
**2% propyltriethoxysilane.

EXAMPLES 22 & 23

As described in examples 1 and 18, wherein the linear low density polyethylene is substituted with isotactic polypropylene.

The results are shown in Table 15.

TABLE 15

| | Examples 22 & 23 | | | |
|---|---|---|---|---|
| | Stress MPa | | Modulus MPa | |
| Weight % of silylated filler | 0 | 20 | 0 | 20 |
| Isotactic polypropylene | 29.5 | — | 104.8 | — |
| Example 22: | — | 33.3 | — | 352.9 |
| Aspen pulp grafted with 2% silane* to polypropylene | | | | |
| Example 23: | — | 36.4 | — | 435.2 |
| Aspen pulp mixed with 25% calcium carbonate and grafted and bonded with 2% silane* to polypropylene | | | | |

*silane bonding agent is gamma-aminopropyltriethoxysilane.

EXAMPLE 24

Particles of aspen wood of 5% water content were wetted by spraying with the organic solution described in example No. 1. A warm air current was then passed in order to evaporate the solvent present in the wetted particles and to form grafted particles with a silylating agent. A powdered linear low density polyethylene of mesh 40 was well mixed with the silylated wood particles in 8% weight ratio. The silylated and mixed wood particles were then molded by hot pressing at 180° C. for 5 minutes and at density 610 kgm/m3 for obtaining board samples having a thickness of 11.1 mm. The internal bond strength is determined by testing specimens in tension perpendicular to the plane of the board specimens. The test was carried out according to CSA 0188 in reference to commercial boards. The results are shown in Table 16.

EXAMPLES 25 & 26

Differently to what was described in example 24, the wood particles are not sprayed with the silylated solution, but are mixed with a ground composite material at mesh 40 prepared as described in examples 1 or 18, which comprise 20 weight percent of the filler. The results are shown in Table 16.

EXAMPLE 27

Differently to what was described in example 24, the acetone solvent was substituted by methyl ethyl ketone, and the linear low density polyethylene was substituted by atactic polystyrene which was previously dissolved in the silylated solution. The results are shown in Table 16.

TABLE 16

| | Internal bond psi |
|---|---|
| Commercial particle board specimens | 85 |
| Example 24 | 90 |
| Example 25 | 93 |
| Example 26 | 88 |

TABLE 16-continued

| | Internal bond psi |
|---|---|
| Example 27 | 92 |

I claim:

1. A composite material comprising a polymeric or copolymeric substance selected from thermoplastic or thermosetting material, or rubber, and an organic material selected from the group consisting of cellulosic or starch material, wherein said cellulosic or starch material is essentially grafted by a free radical generating process with a silylating agent.

2. The composite material of claim 1, wherein polymeric or copolymeric substance is selected from the group consisting of linear low density polyethylene, polypropylene and polystyrene.

3. The composite material of claim 1, wherein the cellulosic material is selected from the group consisting of chemical-thermomechanical wood pulp derived from aspen, birch or spruce and semichemical pulp of bagasse.

4. The composite material of claim 1, which additionally comprises an inorganic filler consisting of a compound containing hydroxyl group, clay, calcium carbonate, asbestos, sand, wollastonite, quartz, glass fibers, mica, diatomaceous earth, silica, talc, kaolinite, aramide, hydrated or partially hydrated metal oxides, metal powders, metal compounds, carbon and graphite.

5. The composite material of claim 4, wherein said inorganic filler material is selected from calcium carbonate, asbestos and clay.

6. The composite material of claim 1, wherein the cellulosic material whether mixed or not with an inorganic filler, comprises 1–99 weight percent based on the total weight of the composite.

7. The composite material of claim 1, wherein the cellulosic material is grafted with said silylating agent by a free radical generating process prior to incorporating same into the polymeric matrix material.

8. The composite material of claim 7, wherein the silylating agent is selected from gamma-aminopropyltriethoxy silane, gamma-methacryloxypropyltrimethoxy silane and propyl triethoxy silane.

9. A process for preparing a composite material which comprises, (a) providing an organic material selected from the group consisting of cellulosic material or starch,
(b) wetting said organic material with a silylating agent,
(c) subjecting the wetted organic material obtained in (b) to a free radical generating process to give essentially a cellulosic material or starch grafted by said free radical generating process with said silylating agent,
(d) bonding said essentially grafted cellulosic material or starch obtained in (c) with a polymeric or copolymeric substance selected from thermoplastic or thermosetting material, or rubber to give said composite material.

10. A process according to claim 9, wherein said silylating agent is selected from the group consisting of gamma-aminopropyltriethoxy silane, gamma-methacryloxypropyltrimethoxy silane and propyltriethoxy silane.

11. A process according to claim 9, wherein the silylating agent is dissolved in a solvent to form a solution.

12. A process according to claim 9, wherein said cellulosic material is selected from the group consisting of chemical-thermomechanical wood pulp derived from aspen, birch or spruce and semichemical pulp of bagasse.

13. A process according to claim 12, wherein said solution also contains catalytic initiator.

14. A process according to claim 13, wherein said solution also contains acid anhydride.

15. A process according to claim 14, wherein the catalytic initiator is selected from benzoyl peroxide and the acid anhydride is maleic anhydride.

16. A process according to claim 15, wherein the solvent is evaporated by passing a current of warm air over said wetted organic material.

17. A process according to claim 9, wherein said thermoplastic material comprises linear low density polyethylene, polypropylene and polystyrene.

18. A process according to claim 9, which comprises mixing said cellulosic material or starch with an inorganic filler before step (b).

19. A process according to claim 18, wherein said inorganic filler comprises calcium carbonate, asbestos or clay.

20. The composite material of claim 1, wherein said silylating agent is prehydrolyzed.

* * * * *